United States Patent
Maes (10) Patent No.: US 7,870,412 B2
(45) Date of Patent: Jan. 11, 2011

(54) PASSING CLIENT OR SERVER INSTRUCTIONS VIA SYNCHRONIZED DATA OBJECTS

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 846 days.

(21) Appl. No.: 11/757,881

(22) Filed: Jun. 4, 2007

(65) Prior Publication Data

US 2008/0082853 A1   Apr. 3, 2008

Related U.S. Application Data

(60) Provisional application No. 60/827,294, filed on Sep. 28, 2006.

(51) Int. Cl.
 *G06F 1/12* (2006.01)
 *G06F 7/00* (2006.01)
 *G06F 15/16* (2006.01)
 *G06F 15/00* (2006.01)

(52) U.S. Cl. ............. 713/400; 707/610; 707/803; 707/809; 709/203; 709/232; 709/246; 709/248; 712/25; 712/31

(58) Field of Classification Search ............ 713/400; 709/203, 232, 246, 248; 712/25, 31; 707/610, 707/803, 809
See application file for complete search history.

(56) References Cited

U.S. PATENT DOCUMENTS

| | | | |
|---|---|---|---|
| 7,003,587 B1 * | 2/2006 | Battat et al. | 709/227 |
| 7,536,421 B2 * | 5/2009 | Tsinman et al. | 1/1 |
| 2004/0268364 A1 * | 12/2004 | Faraj | 719/316 |
| 2006/0074996 A1 * | 4/2006 | Corbett et al. | 707/201 |

\* cited by examiner

*Primary Examiner*—Stefan Stoynov
(74) *Attorney, Agent, or Firm*—Townsend and Townsend and Crew, LLP (57) ABSTRACT

Methods, systems, and machine-readable media are disclosed for passing executable instructions via synchronized data objects. According to one embodiment, passing executable instructions from a first device to a second device during a synchronization operation between the first device and the second device can comprise synchronizing one or more data objects between the first device and the second device. At least one of the one or more data objects can include one or more executable instructions from the first device. The one or more executable instructions can be read from the data objects on the second device. Each of the one or more executable instructions may then be executed on the second device.

42 Claims, 5 Drawing Sheets

PASSING CLIENT OR SERVER INSTRUCTIONS VIA SYNCHRONIZED DATA OBJECTS

CROSS-REFERENCES TO RELATED APPLICATIONS

This application claims the benefit of U.S. Provisional Application No. 60/827,294, filed Sep. 28, 2006 by Stephane H. Maes and entitled "Passing Client or Server Instructions via Synchronized Data Objects," the entire disclosure of which is incorporated herein by reference.

BACKGROUND OF THE INVENTION

Embodiments of the present invention relate generally to communications in a network and more particularly to passing executable instructions via synchronized data objects.

Different proprietary and standard methods exist to synchronize data between clients and servers or between devices. However, these methods solely allow the synchronization of the data. They do not support exchange of data specific instructions to be executed on the client or on the server or on another device that is a party to the synchronization.

While with techniques like Push Internet Message Access Protocol (P-IMAP) and the derived Lemonade standard it is possible to exchange executable instructions via IMAP instructions/extensions, when using generic database synchronization/replication methods, it is not possible to send such instructions as additional instructions that would be data type specific and break the generic data synchronization behavior. This could only be done via side channel or out-of-band communications between the client and the server, something not desirable if one planned or intended to use data synchronization/replication protocols.

Hence, there is a need for methods and systems that provide for passing executable instructions via synchronized data objects.

BRIEF SUMMARY OF THE INVENTION

Embodiments of the invention provide systems and methods for passing executable instructions via synchronized data objects. According to one embodiment, a method for passing executable instructions from a first device to a second device during a synchronization operation between the first device and the second device can comprise synchronizing one or more data objects between the first device and the second device. At least one of the one or more data objects can include one or more executable instructions from the first device. The one or more executable instructions can be read from the data objects on the second device. Each of the one or more executable instructions may then be executed on the second device.

The one or more executable instructions can include, for example, instruction specific to a single data record. In other cases, the one or more executable instructions can include general instructions applicable to multiple data records. The executable instructions can relate to data within the one or more data objects synchronized or to data not within the one or more data objects synchronized. In some cases, the one or more instructions can comprise instructions for affecting the global behavior of the second device, i.e., the behavior of the device outside of or in addition to the synchronization process. For example, executing each of the one or more executable instructions on the second device can cause the second device to combine data edited on the first device with data from the second device or with other data from the first device etc. In other cases, executing the instructions can cause identified data to be converted and/or processed a certain way. For example, an email can be forwarded or replied to without downloading data via synchronization. That is, the data of the email can be synchronized with data from elsewhere when forwarding or replying. In this way, there is no need to send the additional data as part of the synchronization if it is already available on the recipient, i.e., second device.

According to one embodiment, each of the executable instructions can further comprise one or more arguments. For example, the one or more arguments can include an indication of data to which the instruction relates, either on one of the devices or elsewhere. The argument can include an indication of a source location of the data to which the instruction relates, a destination location for the data to which the instruction relates, a process for delegation of further handling of the data and/or the instruction(s), etc. In other examples, the arguments can include an indication of a one or more other instructions to be performed and/or a location of one or more other instructions to be performed. In some cases, the one or more arguments can include an indication of one or more conversion parameters for the data to which the instruction relates. In another example, the one or more arguments can include an indication of data to be exchanged between the first device and the second device. In yet another example, the one or more arguments can include an indication of a filter and the one or more instructions activate the filter for application to the data to be exchanged between the first device and the second device.

In some cases, the one or more arguments can include an indication of an email address and the instruction can comprise an instruction to send an email message to the address indicated. In such cases, the method can further include completing an email message on the second device and sending the email message to the address indicated. Completing the email message on the second device can comprise adding a body to the email message, adding an attachment to the email message, editing a body of the message with changes from the first device, editing an attachment to the message with changes from the first device, or adapting at least part of the email message to capabilities of a third device. Adapting at least part of the email message to capabilities of the third device can comprise, for example, converting the at least part of the email message to a MIME type or character set for the third device.

According to another embodiment, a system can comprise a first device and a second device communicatively coupled with the first device. The second device can be adapted to synchronize one or more data objects with the first device. At least one of the one or more data objects can include one or more executable instructions from the first device. The second device can read the one or more executable instructions from the data objects. The second device can be further adapted to execute each of the one or more executable instructions.

The one or more executable instructions can include, for example, instruction specific to a single data record. In other cases, the one or more executable instructions can include general instructions applicable to multiple data records. The executable instructions can relate to data within the one or more data objects synchronized or to data not within the one or more data objects synchronized. For example, executing each of the one or more executable instructions on the second device can cause the second device to combine data edited on the first device with data from the second device.

According to yet another embodiment, a machine-readable medium can have stored thereon a series of instructions which, when executed by a processor, cause the processor to pass executable instructions from a first device to a second device during a synchronization operation between the first device and the second device by synchronizing one or more data objects between the first device and the second device. At least one of the one or more data objects includes one or more executable instructions from the first device. The one or more executable instructions can be from the data objects on the second device and executed by the second device.

The one or more executable instructions can include, for example, instruction specific to a single data record. In other cases, the one or more executable instructions can include general instructions applicable to multiple data records. The executable instructions can relate to data within the one or more data objects synchronized or to data not within the one or more data objects synchronized. For example, executing each of the one or more executable instructions on the second device can cause the second device to combine data edited on the first device with data from the second device.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the present invention are directed to methods, system and machine-readable media that provide for passing executable instructions via synchronized data objects. That is, embodiments of the present invention provide a mechanism to allow a server and client or other parties to a synchronization operation to exchange instructions that can be used to perform tasks on the client and/or server or other device at the request of the other party, for a particular data record, or independently of the data record, without changing the underlying synchronization operation.

Generally speaking, a data record schema can be defined for the type of data record to synchronize between the client and the server or other devices. However, the schema can be extended with fields that define the operation to apply. These operations can apply to one or more specific data records. For example, the instructions may provide for determining an address to which to send an email, they may provide conversion parameters for one or more fields of the record (including for example the header or the body of the email), or they may provide information on what field to pass and what not to pass to the client, server, or other device that is a party to the synchronization. Alternatively of additionally, the operations may apply generally to data being synchronized. For example, the instructions may indicate or activate a filter to apply to the exchanged data. Other operations performed or initiated by the instructions may alternatively or additionally be implemented and are considered to be within the scope of the present invention.

Objects within the extended schema, i.e., data objects with the imbedded instructions, can then be synchronized using any of the conventional methods. Once the data object has been received by the client, server, or other device, the recipient can read the instruction field or fields and act on them as they describe. So, for example, in the case of databases that represent email for email synchronization such as Lotus Notes or Open Mobile Alliance Data Synchronization (OMA DS), the instruction can cause the recipient to send an email completed on the recipient and copy it into a sent items folder. In another example, the instructions can cause the recipient to adapt part or all of an email to the capabilities of a device or based on some other criteria, e.g. to a particular MIME type or character set.

In yet another example, the instructions can cause a server to combine data edited on a client with data on the server not downloaded to the client. So, in such an example, the server can forward an email to a new address and add a body or attachment wherein the body or attachment is in whole or in part from the server without downloading to the client. Additionally or alternatively, the body or attachment from the server can be edited with the diff of edits made on the client without requiring the client to upload the whole new document to the server. Again, other operations performed or initiated by the instructions may alternatively or additionally be implemented and are considered to be within the scope of the present invention.

Figure 1:
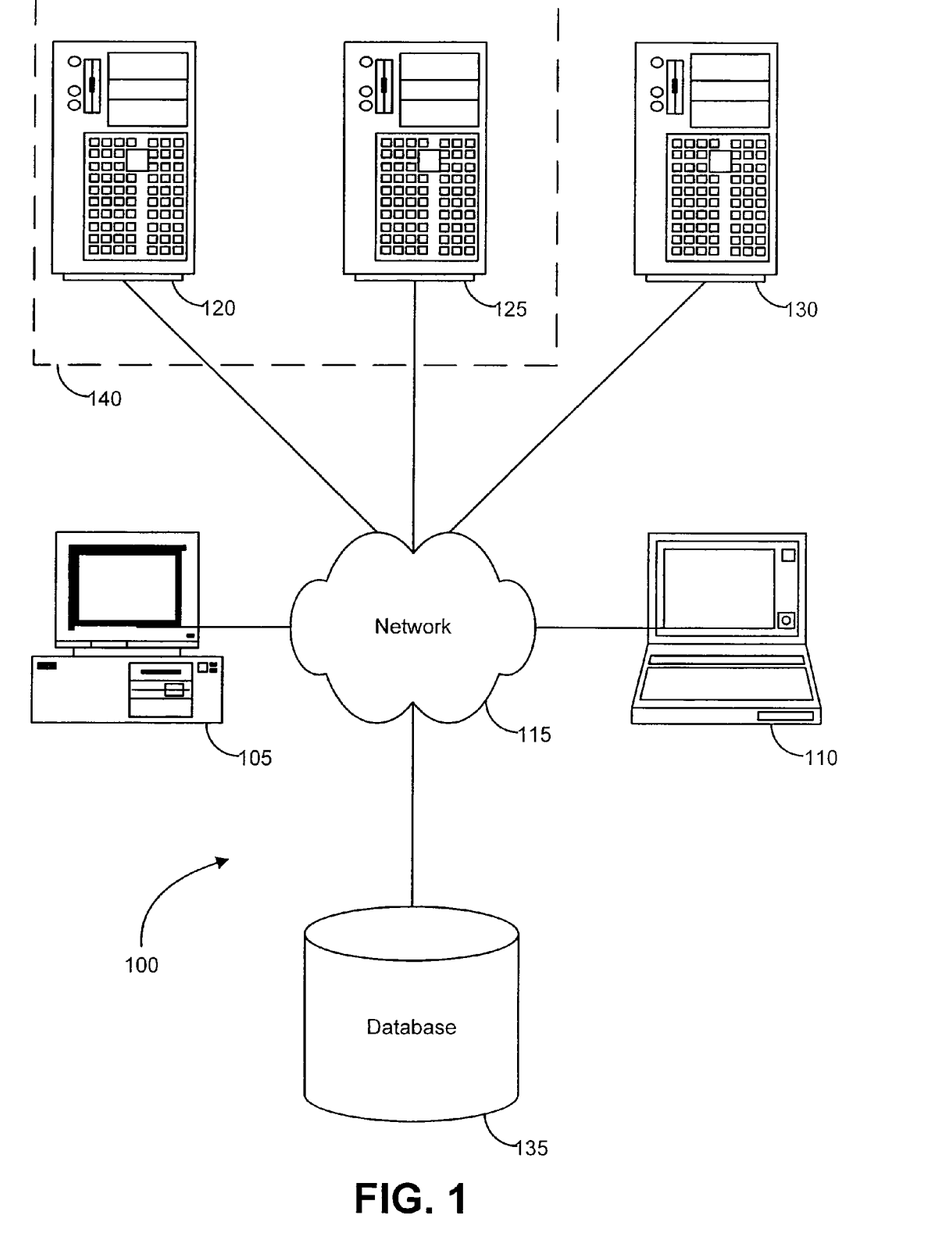
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
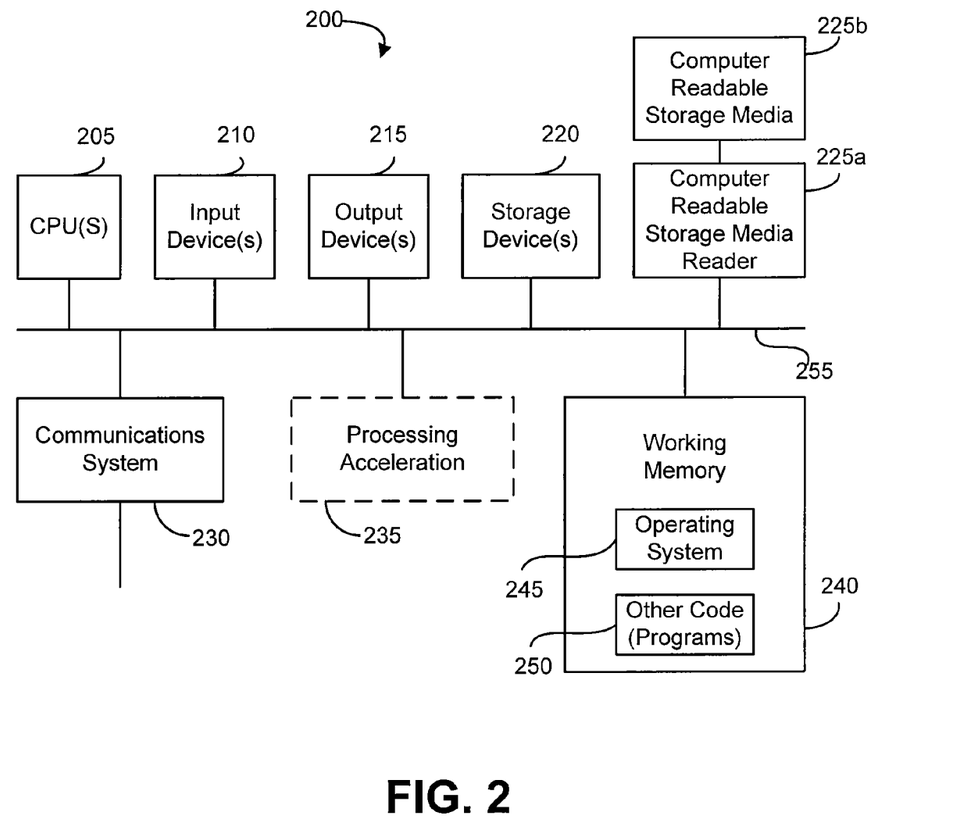
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs)

205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
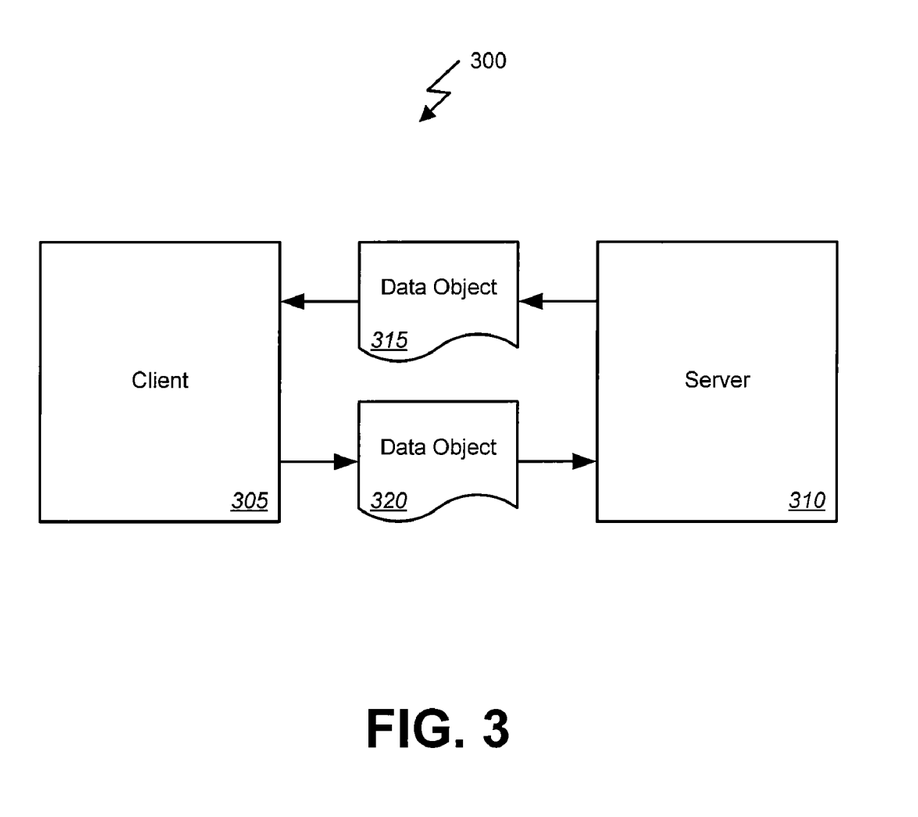
FIG. 3 is a block diagram illustrating, at a high level, a system for passing client and/or server instructions via synchronized data objects according to one embodiment of the present invention.

FIG. 3 is a block diagram illustrating, at a high level, a system for passing client and/or server instructions via synchronized data objects according to one embodiment of the present invention. In this example, the system 300 includes a client 305 and a server 310. However, it should be noted that embodiments of the present invention may, in some cases, be implemented on other types of devices and/or in other contexts such as in a peer-to-peer arrangement. Therefore, it should be understood that embodiments of the present invention are not limited to client-server arrangements. Rather, the devices used in various embodiments of the present invention can comprise servers, clients, various combinations of clients and servers, or any other type of computing device.

As noted above, embodiments of the present invention provide a mechanism to allow the server 310 and client 305 or other parties to a synchronization operation to exchange instructions that can be used to perform tasks on the client 305 and/or server 310 or other device at the request of the other party, for a particular data record, or independently of the data record, without changing the underlying synchronization operation.

Generally speaking, a data record schema can be defined for the type of data objects 315 and 320 to synchronize between the client 305 and the server 310 or other devices. As will be discussed below with reference to FIG. 4, the schema can be extended with fields that define the operation to apply. Objects within the extended schema, i.e., the data objects 315 and 320 with the imbedded instructions, can then be synchronized between the client 305 and server 310 using any of the conventional methods. Once the data object 315 or 320 has been received by the client 305, server 310, or other device, the recipient can read the instruction field or fields and act on them as they describe.

Figure 4:
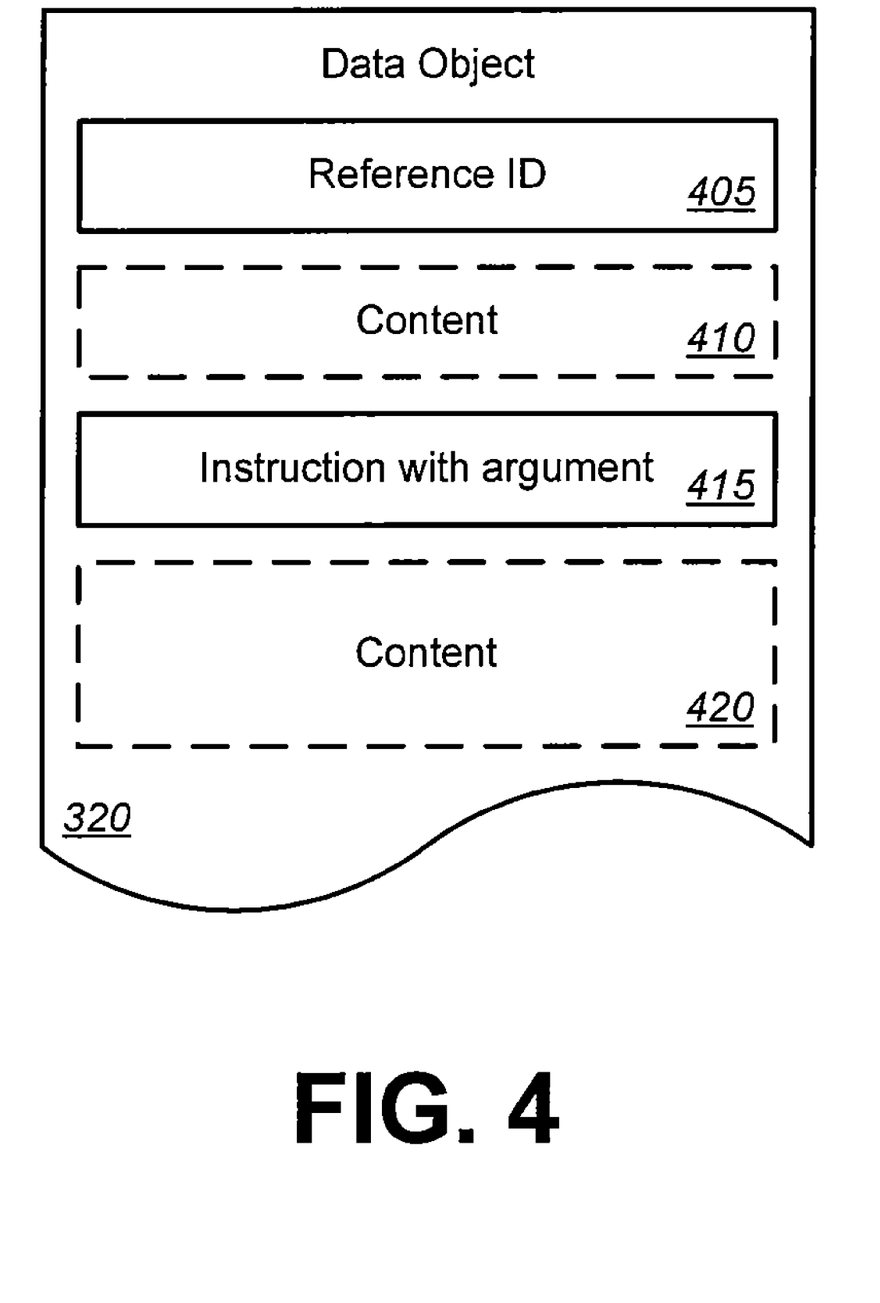
FIG. 4 is a block diagram illustrating contents of a data object for passing client and/or server instructions according to one embodiment of the present invention.

FIG. 4 is a block diagram illustrating contents of a data object for passing client and/or server instructions according to one embodiment of the present invention. In this example, a data object 320 includes one or more reference identifiers 405 and one or more instructions 415. The reference identifier 405 can identify one or more pieces of information in the data object or elsewhere to which the instructions 415 apply or relate. The instructions 415 can be in the form of a set of instruction with one or more arguments. For example, the one or more arguments can include an indication of data to which the instruction relates, either on one of the devices or elsewhere. The argument can include an indication of a source location of the data to which the instruction relates, a destination location for the data to which the instruction relates, a process for delegation of further handling of the data and/or the instruction(s), etc. In other examples, the arguments can include an indication of a one or more other instructions to be performed and/or a location of one or more other instructions to be performed. In some cases, the one or more arguments can include an indication of one or more conversion parameters for the data to which the instruction relates. In another example, the one or more arguments can include an indication of data to be exchanged between the first device and the second device. In yet another example, the one or more arguments can include an indication of a filter and the one or more instructions activate the filter for application to the data to be exchanged between the first device and the second device. The data object 320 can also optionally include one or more content elements 410 and 420.

As noted above, these instructions 415 can apply to one or more specific data records in the content elements 410 and 420 or elsewhere as indicted, for example, by the reference identifier 405. For example, the instructions may provide for determining an address to which to send an email, they may provide conversion parameters for one or more fields of the record, or they may provide information on what field to pass and what not to pass to the client, server, or other device that is a party to the synchronization. Alternatively of additionally, the operations may apply generally to data being synchronized. For example, the instructions may indicate or activate a filter to apply to the exchanged data. Other operations performed or initiated by the instructions may alternatively or additionally be implemented and are considered to be within the scope of the present invention.

The following is an exemplary data object description as may be represented by data object 320. In this example, the data object is presented as an OMA DS object. This data object is offered by way of example for illustrative purposes only and is not intended to imply any limitations on the various embodiments of the present invention. Numerous variations are possible without departing from the scope of the present invention depending upon the exact implementation.

```
<!--
Example of email data object
-->
<?xml version="1.0" encoding="UTF-8"?>
<!-- Email Object Definition-->
<!ELEMENT EmailObject (
    HEADER,
    TOC?,
    BODY?,
    ExtensionBlock?
    )>
<!ATTLIST EmailObject xmlns CDATA #REQUIRED>
<!-- Header definition -->
<!ELEMENT HEADER (
    OriginatorFields?,
    DestinationFields?,
    IdentificationFields?,
    InformationFields?,
    ResentFields?,
    TraceFields?,
    OptionalFields?,
    IMAPFlags*,
    TotalSize,
    ExtensionBlock?
    )>
<!-- Table of contents definition -->
<!ELEMENT TOC (
    BodyPartDescription*,
    ExtensionBlock?
    )>
<!-- Bodypart definition -->
<!ELEMENT BODY (
    BodyPart+,
    ExtensionBlock?
    )>
<!-- Header structure definitions -->
                            <!-- RFC2822::3.6.1 and 3.6.2 -->
<!ELEMENT OriginatorFields (
    HeaderField+
    )>
                            <!-- RFC2822::3.6.3 -->
<!ELEMENT DestinationFields (
    HeaderField+
    )>
                            <!-- RFC2822::3.6.4 -->
<!ELEMENT IdentificationFields (
    HeaderField+
    )>
<!ELEMENT References (
    HeaderField+
    )>
                            <!-- RFC2822::3.6.5 -->
<!ELEMENT InformationFields (
    HeaderField+
    )>
                            <!-- RFC2822::3.6.6 -->
<!ELEMENT ResentFields (
    HeaderField+
    )>
                            <!-- RFC2822::3.6.7 -->
<!ELEMENT TraceFields (
    HeaderField+
    )>
                            <!-- RFC2822::3.6.8 -->
<!ELEMENT OptionalFields (
    HeaderField+
    )>
<!ELEMENT IMAPFlags (
    IMAPFlag+
    )>
<!ATTLIST IMAPFlags
    scope (Permanent | SessionOnly) #REQUIRED
    >
<!-- Header terminating element definitions -->
<!ELEMENT TotalSize (#PCDATA)>   <!-- Size of the whole message
in octets when transfer encoded -->
<!ELEMENT MessageID (#PCDATA)>   <!-- RFC2822::message-id -->
<!ELEMENT HeaderField (#PCDATA)> <!-- RFC2822::fields -->
<!ELEMENT IMAPFlag (#PCDATA)>    <!-- RFC3501::2.3.2 -->
```

-continued

```
<!-- Table of contents structure definitions -->
<!ELEMENT BodyPartDescription (
    ReferenceID?,
    MIMEFields,
    IsProtected,
    Alternatives?,
    BodyPartDescription*,
    ExtensionBlock?
    )>
<!ELEMENT MIMEFields (
    Name?,
    Type,
    SubType,
    Parameters?,
    Language?,
    Encoding?,
    Size?,
    MD5Checksum?,
    ExtensionBlock?
    )>
<!ELEMENT Alternatives (
    Alternative+,
    ExtensionBlock?
    )>
<!ELEMENT Alternative (
    ReferenceID,
    MIMEFields,
    ExtensionBlock?
    )>
<!ELEMENT Parameters (
    Parameter+
    )>
<!-- Table of contents terminating element definitions --->
<!ELEMENT ReferenceID (#PCDATA)>      <!-- Unique ID assigned
by the server -->
<!ELEMENT IsProtected (#PCDATA)>      <!-- Is it protected by
some DRM solution? -->
<!ELEMENT Name (#PCDATA)>             <!-- Description of an
object (e.g. filename) -->
<!ELEMENT Type (#PCDATA)>             <!-- Content media type
name, see [RFC2045] -->
<!ELEMENT SubType (#PCDATA)>          <!-- Content media subtype
name, see [RFC2045] -->
<!ELEMENT Parameter (#PCDATA)>        <!-- Attribute/value pairs,
see [RFC2045] (e.g. charset) -->
<!ELEMENT Language (#PCDATA)>         <!-- Body language
value, see [BCP47] and [RFC 3066], -->
<!ELEMENT Encoding (#PCDATA)>         <!-- Content transfer
encoding, see [RFC2045] -->
<!ELEMENT Size (#PCDATA)>             <!-- Size of the body in
octets when transfer encoded -->
<!ELEMENT MD5Checksum (#PCDATA)>      <!-- MD5 checksum of
the bodypart, see [RFC1864] -->
<!-- Bodypart structure definitions -->
<!ELEMENT BodyPart (
    Sequence ID,
    Data,
    ExtensionBlock?
    )>
<!-- Bodypart terminating element definitions -->
<!ELEMENT SequenceID (#PCDATA)>       <!-- Unique ID, integer
from 0 to n -->
<!ELEMENT Data (#PCDATA)>             <!-- Actual data of the
body -->
<!-- General purpose definitions -->
<!ELEMENT ExtensionBlock (#PCDATA)>   <!-- This allows custom
extensions and instructions + arguments-->
<!ATTLIST ExtensionBlock xmlns CDATA #REQUIRED>   <!-- Custom
extensions must provide namespace -->
```

The following is another exemplary data object as may be represented by data object 320. In this example, the data object is presented as an OMA DS object. Again, this data object is offered by way of example for illustrative purposes only and is not intended to imply any limitations on the various embodiments of the present invention. Numerous variations are possible without departing from the scope of the present invention depending upon the exact implementation.

```
<EmailObject xmlns="http://www.???.org/DTD/????">
   <HEADER>
      <OriginatorFields>
         <HeaderField>Date: Thu, 6 May 2006 14:00:00 -0200</HeaderField>
         <HeaderField>From: "John" <john@foo.org></HeaderField>
         <HeaderField>Sender: "Secretary" <secretary@foo.org></HeaderField>
         <HeaderField>Reply-To: "Secretary" <secretary@foo.org></HeaderField>
      </OriginatorFields>
      <DestinationFields>
         <HeaderField>To: "John" <john@foo.org>, "Mike" <mike@foo.org></HeaderField>
         <HeaderField>CC: "Monica" <monica@foo.org></HeaderField>
         <HeaderField>BCC: "Archive" <archive@foo.org></HeaderField>
      </DestinationFields>
      <IdentificationFields>
         <HeaderField>Message-ID: <11111.11111.DSMailSYSTEM@foo></HeaderField>
         <HeaderField>In-Reply-To: <22222.22222.DSMailSYSTEM@foo></HeaderField>
         <HeaderField>References: <33333.33333.DSMailSYSTEM@foo></HeaderField>
         <HeaderField>In-Forward-To: <11111.11111.DSMailSYSTEM@foo></HeaderField>
      </IdentificationFields>
      <InformationFields>
         <HeaderField>Subject: Meeting tomorrow</HeaderField>
         <HeaderField>Comments: Authenticated sender is <secretary@foo.org></HeaderField>
         <HeaderField>Keywords: meeting, customer, product, development</HeaderField>
      </InformationFields>
      <ResentFields>
         <HeaderField>Resent-Date: Thu, 6 May 2006 14:00:00 -0200</HeaderField>
         <HeaderField>Resent-From: "John" <john@foo.org></HeaderField>
         <HeaderField>Resent-Sender: "Secretary" <secretary@foo.org></HeaderField>
         <HeaderField>Resent-To: "John" <john@foo.org>, "Mike" <mike@foo.org></HeaderField>
         <HeaderField>Resent-Cc: "Monica" <monica@foo.org></HeaderField>
         <HeaderField>Resent-Bcc: "Archive" <archive@foo.org></HeaderField>
         <HeaderField>Resent-Message-ID: <11111.11111.DSMailSYSTEM@foo></HeaderField>
      </ResentFields>
      <TraceFields>
         <HeaderField>Return-Path: <secretary@foo.org></HeaderField>
         <HeaderField>Received: from mail.foo.org (mail.foo.org [127.0.0.1]) by mail2.foo.org (8.11.1/8.11.1) with ESMTP id f22K5xv12202 for <secretary@foo.org> Thu, 6 May 2006 14:00:02 -0200 (EST)</HeaderField>
         <HeaderField>Received: from mail2.foo.org (mail2.foo.org [127.0.0.2]) by mail3.foo.org (F-8_9_3_3/8.9.3) with SMTP id MAA14914 for <secretary@foo.org> Thu, 6 May 2006 14:00:01 -0200 (EST)</HeaderField>
      </TraceFields>
      <OptionalFields>
         <HeaderField>Auto-Forwarded:</HeaderField>
         <HeaderField>Content-Language: en</HeaderField>
         <HeaderField>Importance: high</HeaderField>
         <HeaderField>Errors-To: <admin@foo.Org></HeaderField>
         <HeaderField>MIME-Version: 1.0</HeaderField>
         <HeaderField>Sensitivity: company confidential</HeaderField>
         <HeaderField>X-Confirm-Reading-To: <secretary@foo.org></HeaderField>
         <HeaderField>X-Mailer: DSMail 1.0</HeaderField>
      </OptionalFields>
      <IMAPFlags scope="Permanent">
         <IMAPFlag>\Deleted</IMAPFlag>
```

-continued

```
        <IMAPFlag>\Draft</IMAPFlag>
      </IMAPFlags>
      <IMAPFlags scope="SessionOnly">
        <IMAPFlag>\Seen</IMAPFlag>
        <IMAPFlag>\Answered</IMAPFlag>
      </IMAPFlags>
      <TotalSize>20000</TotalSize>
  </HEADER>
  <TOC>
     <BodyPartDescription>
  <ReferenceID>DS_0xABCDEF00@mail.foo.org_<11111.11111.DSMailSYSTEM@foo></ReferenceID>
        <MIMEFields>
           <Type>multipart</Type>
           <SubType>mixed</SubType>
           <Encoding>base64</Encoding>
           <Size>20000</Size>
           <MD5Checksum>a7daae3e1d54cc5c60bbc6d9c95e76b</MD5Checksum>
        </MIMEFields>
        <IsProtected>F</IsProtected>
        <BodyPartDescription>
  <ReferenceID>DS_0xABCDEF01@mail.foo.org_<11111.11111.DSMailSYSTEM@foo></ReferenceID>
           <MIMEFields>
              <Type>text</Type>
              <SubType>html</SubType>
              <Parameters>
                 <Parameter>charset=UTF-8</Parameter>
              </Parameters>
              <Encoding>base64</Encoding>
              <Size>4000</Size>
              <MD5Checksum>d0aaae16ba162dd89d646887f1539855</MD5Checksum>
           </MIMEFields>
           <IsProtected>F</IsProtected>
           <Alternatives>
              <Alternative>
                 <ReferenceID>
  DS_0xABCDEF01_A1@mail.foo.org_<11111.11111.DSMailSYSTEM@foo>
                 </ReferenceID>
                 <MIMEFields>
                    <Type>text</Type>
                    <SubType>plain</SubType>
                    <Parameters>
                       <Parameter>charset=iso-8859-1</Parameter>
                    </Parameters>
                 </MIMEFields>
              </Alternative>
           </Alternatives>
        </BodyPartDescription>
        <BodyPartDescription>
  <ReferenceID>DS_0xABCDEF02@mail.foo.org_<11111.11111.DSMailSYSTEM@foo></ReferenceID>
           <MIMEFields>
              <Name>ArchitectureDrawing20060509.jpg</Name>
              <Type>image</Type>
              <SubType>jpeg</SubType>
              <Parameters>
                 <Parameter>charset=UTF-8</Parameter>
              </Parameters>
              <Encoding>base64</Encoding>
              <Size>16000</Size>
              <MD5Checksum>d0aaae16ba162dd89d646887f1539855</MD5Checksum>
           </MIMEFields>
           <IsProtected>T</IsProtected>
        </BodyPartDescription>
     </BodyPartDescription>
  </TOC>
  <BODY>
     <BodyPart>
        <SequenceID>0</SequenceID>
        <Data>BASE64EncodedDataHere:OriginalMail</Data>
     </BodyPart>
     <BodyPart>
        <SequenceID>1</SequenceID>
        <Data>BASE64EncodedDataHere:MailPart1</Data>
     </BodyPart>
     <BodyPart>
        <SequenceID>2</SequenceID>
        <Data>We have a customer meeting, more blabla up to 1500
```

```
bytes</Data>
    </BodyPart>
    <BodyPart>
      <SequenceID>3</SequenceID>
      <Data>BASE64EncodedDataHere:MailPart3</Data>
    </BodyPart>
  </BODY>
<ExtensionBlock xmlns="http://www.???.org/DTD/????">
<instructions>
<Send/>
<copy><folder="sent"/>
</instructions>
</ EmailObject>
```

Figure 5:
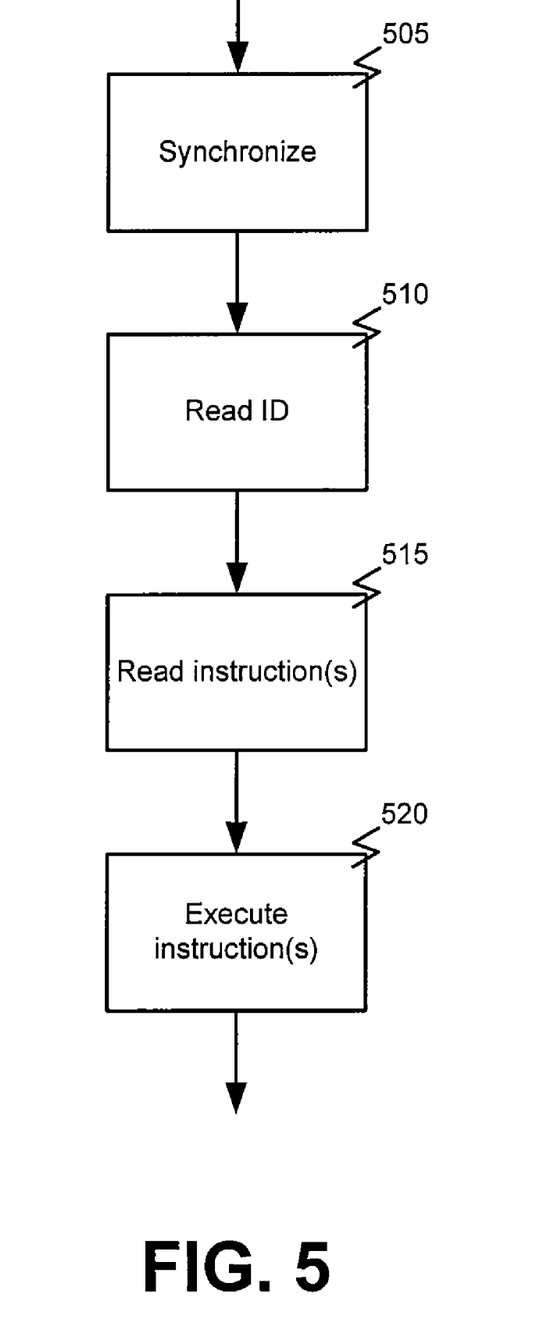
FIG. 5 is a flowchart illustrating a process for passing client and/or server instructions via synchronized data objects according to one embodiment of the present invention.

FIG. 5 is a flowchart illustrating a process for passing executable instructions from a first device to a second device during a synchronization operation between the first device and the second device. In this example, the process begins with synchronizing one or more data objects between the first device and the second device. As noted above, at least one of the one or more data objects can include one or more executable instructions from the first device based on a schema for the data objects.

Also as noted above, the one or more data objects can also include an indication or identifier of data to which the executable instructions relate. The indication or identifier can be read 510 from the data object by the second device. The one or more executable instructions from the data objects can also be read 515 by the second device. As noted above, each of the executable instructions can comprise an instruction and one or more arguments. Therefore reading 515 the instructions from the data object can include reading both the instructions and the arguments.

Each of the one or more executable instructions can then be executed 520 on the second device. As noted above, the one or more executable instructions can include instruction specific to a data record or records as indicated by the identifier. In other cases the one or more executable instructions can include general instructions applicable to all or multiple data records. In either case, the instructions can be executed to cause the second device, i.e., the client, the server, or other device, to perform functions such as those exemplary functions discussed above or others.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of passing executable instructions from a first device to a second device during a synchronization operation between the first device and the second device, the method comprising:
   synchronizing one or more data objects between the first device and the second device, wherein at least one of the one or more data objects includes one or more executable instructions exchanged from the first device to the second device;
   reading the one or more executable instructions from the data objects on the second device; and
   executing each of the exchanged one or more executable instructions on the second device.

2. The method of claim 1, wherein executing each of the one or more executable instructions on the second device causes the second device to combine data edited on the first device with data from the second device.

3. The method of claim 1, wherein the one or more executable instructions include instruction specific to a single data record.

4. The method of claim 1, wherein the one or more executable instructions include general instructions applicable to multiple data records.

5. The method of claim 1, wherein the one or more executable instructions include instructions for affecting the global behavior of the second device.

6. The method of claim 1, wherein the executable instructions relate to data within the one or more data objects synchronized.

7. The method of claim 1, wherein the executable instructions relate to data not within the one or more data objects synchronized.

8. The method of claim 7, wherein the executable instructions relate to data stored on the second device.

9. The method of claim 1, wherein each of the executable instructions further comprises one or more arguments.

10. The method of claim 9, wherein the one or more arguments include an indication of data to which the instruction relates.

11. The method of claim 10, wherein the argument identifies a destination location for the data to which the instruction relates.

12. The method of claim 10, wherein the argument identifies a source location for the data to which the instruction relates.

13. The method of claim 10, wherein the argument identifies a process for delegating handling of the data to which the instruction relates.

14. The method of claim 10, wherein the argument identifies a process for delegating handling of the instruction.

15. The method of claim 9, wherein the one or more arguments further include an indication of one or more conversion parameters for the data to which the instruction relates.

16. The method of claim 9, wherein the one or more arguments include an indication of data to be exchanged between the first device and the second device.

17. The method of claim 16, wherein the one or more arguments further include an indication of a filter and the one or more instructions activate the filter for application to the data to be exchanged between the first device and the second device.

18. The method of claim 9, wherein the argument includes an indication of one or more instructions to perform.

19. The method of claim 9, wherein the argument includes an indication of a location of one or more instructions to perform.

20. The method of claim 9, wherein the one or more arguments include an indication of an email address and the instruction comprises an instruction to send an email message to the address indicated.

21. The method of claim 20, further comprising completing an email message on the second device and sending the email message to the address indicated.

22. The method of claim 21, wherein completing the email message on the second device comprises adding a body to the email message.

23. The method of claim 21, wherein completing the email message on the second device comprises adding an attachment to the email message.

24. The method of claim 21, wherein completing the email message on the second device comprises editing a body of the message with changes from the first device.

25. The method of claim 21, wherein completing the email message on the second device comprises editing an attachment to the message with changes from the first device.

26. The method of claim 21, wherein completing the email message on the second device comprises adapting at least part of the email message to capabilities of a third device.

27. The method of claim 26, wherein adapting at least part of the email message to capabilities of the third device comprises converting the at least part of the email message to a MIME type for the third device.

28. The method of claim 26, wherein adapting at least part of the email message to capabilities of the third device comprises converting the at least part of the email message to a character set for the third device.

29. A system comprising:
a first device;
a second device communicatively coupled with the first device and adapted to synchronize one or more data objects with the first device, wherein at least one of the one or more data objects includes one or more executable instructions exchanged from the first device to the second device, and read the one or more executable instructions from the data objects on the second device,
wherein the second device is further adapted to execute each of the exchanged one or more executable instructions from the first device.

30. The system of claim 29, wherein the one or more executable instructions include instruction specific to a single data record.

31. The system of claim 29, wherein the one or more executable instructions include general instructions applicable to multiple data records.

32. The system of claim 29, wherein the executable instructions relate to data within the one or more data objects synchronized.

33. The system of claim 29, wherein the executable instructions relate to data not within the one or more data objects synchronized.

34. The system of claim 29, wherein the first device comprises a client and the second device comprises a server.

35. The system of claim 29, wherein the first device comprises a server and the second device comprises a client.

36. The system of claim 29, wherein the first device and the second device both comprise clients.

37. The system of claim 29, wherein the first device and the second device both comprise servers.

38. A machine-readable medium having stored thereon a series of instructions which, when executed by a processor, cause the processor to passing executable instructions from a first device to a second device during a synchronization operation between the first device and the second device by:
synchronizing one or more data objects between the first device and the second device, wherein at least one of the one or more data objects includes one or more executable instructions exchanged from the first device to the second device;
reading the one or more executable instructions from the data objects on the second device; and
executing each of the exchanged one or more executable instructions on the second device.

39. The machine-readable medium of claim 38, wherein the one or more executable instructions include instruction specific to a single data record.

40. The machine-readable medium of claim 38, wherein the one or more executable instructions include general instructions applicable to multiple data records.

41. The machine-readable medium of claim 38, wherein the executable instructions relate to data within the one or more data objects synchronized.

42. The machine-readable medium of claim 38, wherein the executable instructions relate to data not within the one or more data objects synchronized.

* * * * *